United States Patent [19]
Wallace

[11] 3,813,932
[45] June 4, 1974

[54] STEERING LINKAGE TESTING APPARATUS

[76] Inventor: Virgil T. Wallace, Box 831, Gladewater, Tex. 75647

[22] Filed: June 22, 1971

[21] Appl. No.: 155,641

Related U.S. Application Data

[63] Continuation of Ser. No. 883,392, Dec. 9, 1969, abandoned.

[52] U.S. Cl. ................................................ 73/118
[51] Int. Cl. ......................................... G01m 17/06
[58] Field of Search............ 73/118; 33/169 R, 170, 33/171, 172 R, 172 E

[56] References Cited
UNITED STATES PATENTS
2,655,731 10/1953 Sibble ............................ 33/169 R
3,368,283 2/1968 Vasseur .......................... 33/169 R Primary Examiner—Jerry W. Myracle
Attorney, Agent, or Firm—Dwight H. Smiley; Imirie & Smiley

[57] ABSTRACT

An apparatus for testing the play in the linkage between the steerable dirigible wheels and the steering wheel of a vehicle, comprises sensing means pivotally supported by a housing for engaging one of the dirigible wheels, an electric circuit including signal means, a source of electrical energy and switch means, the switch means including moveable control means actuated by the sensing means and cooperative with fixed energizing means supported by the housing. The signal means is operated when the control means is moved upon swinging movement of the sensing means. Means also are provided for indicating steering wheel travel, including means carried by the steering wheel and moveable relative to a fixed reference point.

12 Claims, 5 Drawing Figures

PATENTED JUN 4 1974  3,813,932
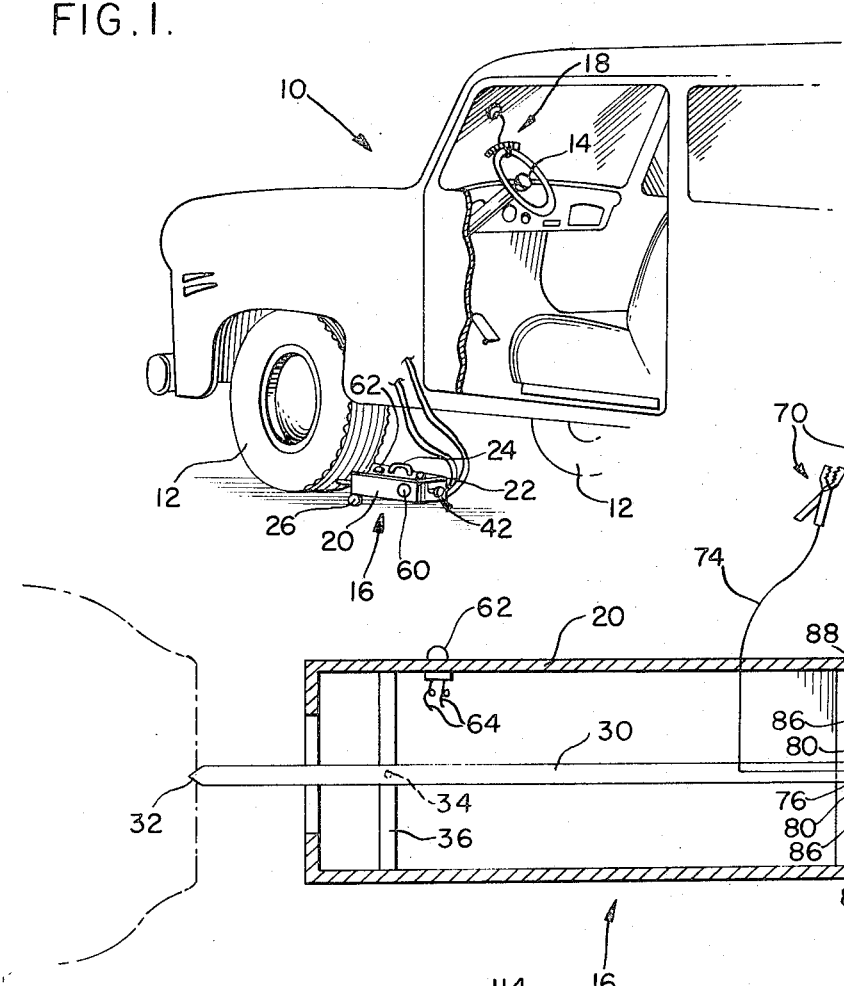
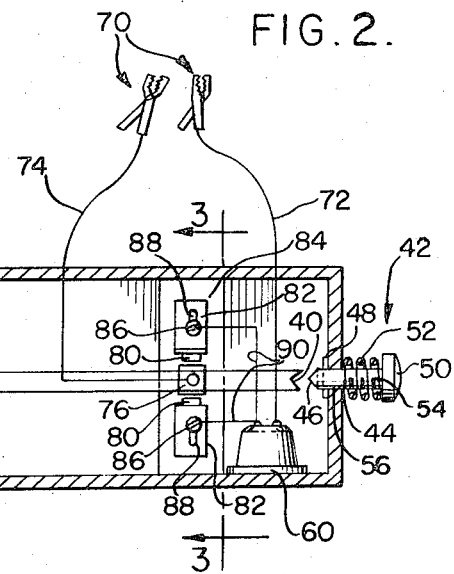
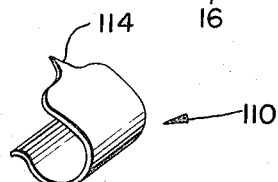
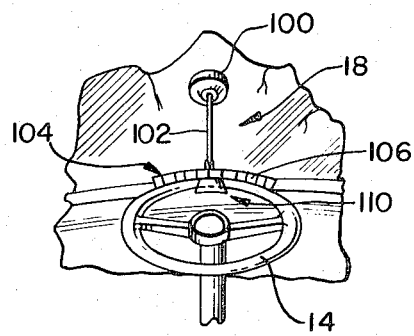
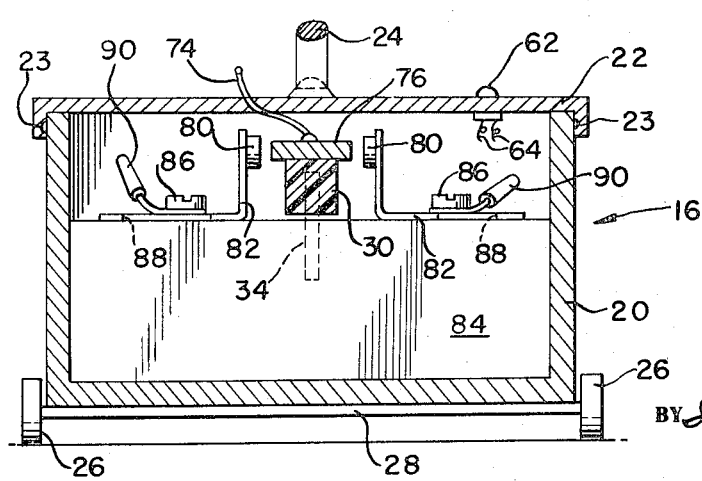
INVENTOR
VIRGIL T. WALLACE
BY Imirie, Smiley, Snyder & Butrum
ATTORNEYS

STEERING LINKAGE TESTING APPARATUS

This application is a continuation of Serial No. 883,392, now abandoned.

BACKGROUND OF THE INVENTION

The present invention relates to a steering linkage testing apparatus, and more particularly to apparatus to by employed with vehicles such as automobiles for indicating the amount of steering wheel travel in relation to turning movement of the dirigible wheels of the vehicle.

It is customary in State inspections of automobiles to determine the amount of steering wheel travel in relation to front wheel movement in order to ascertain whether a hazardous operating condition exists. This type of test indicates whether or not the steering linkage is in good operating condition or whether maintenance thereof is required.

The apparatus of the present invention is of particular utility in carrying out this type of automotive inspection since it very accurately indicates within a fraction of an inch the amount of steering wheel travel in relation to front wheel movement so that this type of testing procedure need not be carried out solely by the judgement of a safety inspector. It is apparent that the owner of the car will readily agree with the inspector's decision when the apparatus of the present invention is employed since excessive steering wheel travel can be readily and accurately detected.

SUMMARY OF THE INVENTION

A housing pivotally supports sensing means engageable with one of the dirigible wheels of the vehicle so that turning movement of such dirigible wheel causes pivotal movement of the sensing means.

An electrical circuit is provided including signal means, switch means and a source of electrical energy. The switch means comprises moveable contact means carried by the sensing means and fixed contact means supported by the housing. When the moveable contact means engages the fixed contact means, the signal means is operated so as to apprise a person of movement of the dirigible wheels of the vehicle.

Lock means is also provided for holding the sensing means in inoperative position when the apparatus is not in use so as to protect the mechanism thereof and particularly to prevent the switch contacts from swinging into engagement with one another in an inadvertent manner.

Steering wheel movement indicating means is also provided for indicating the steering wheel travel so that a person can readily determine the exact amount of steering wheel travel which is required to produce movement of the dirigible wheels of the vehicle. This steering wheel movement indicating means includes fixed means supported by the vehicle and moveable means carried by the steering wheel and moveable therewith.

BRIEF DESCRIPTION OF THE DRAWINGS

FIG. 1 is a top perspective fragmentary view of a portion of an automobile with the apparatus of the present invention operatively associated therewith;

FIG. 2 is a sectional view looking downwardly within the housing of the dirigible wheel movement detecting means;

FIG. 3 is a sectional view on an enlarged scale taken substantially along line 3—3 of FIG. 2;

FIG. 4 is a top perspective fragmentary view of the steering wheel movement indicating means; and FIG. 5 is a top perspective view of a moveable portion of the steering wheel movement indicating means which is clipped onto the steering wheel.

DESCRIPTION OF THE PREFERRED EMBODIMENT

Referring now to the drawing wherein like reference characters designate corresponding parts throughout the several views, as seen in FIG. 1 a conventional automotive vehicle 10 includes a pair of dirigible wheels 12 at the forward end thereof. The usual steering wheel 14 is provided within the driver's compartment for steering and turning the dirigible wheels in a well-known manner. Dirigible wheel movement detecting means 16 is disposed in operative relationship with respect to an associated dirigible wheel of the vehicle. A steering wheel movement indicating means is supported within the driver's compartment of the vehicle.

Referring now to FIGS. 2 and 3, the dirigible wheel movement detecting means 16 includes a substantially rectangular open top housing 20 having a removable cover 22 diposed thereon, this cover snapping into place and being held in operative position by a bead 23 extending around the periphery of housing 20 and fitting within a cooperating groove formed in the inner surface of a depending flange portion of the cover. A handle 24 is secured to the upper surface of the cover for carrying the housing or for manipulating it into desired position. A pair of wheels 26 are supported at opposite ends of an axle 28 fixed to housing 20 whereby the housing can be readily moved from place to place.

Sensing means includes an elongated sensing member 30 having a sharpened end portion 32 adapted to engage one of the dirigible wheels of 12 to be tested. Member 30 is pivotally supported on a pin 34 secured to a member 36 supported within the housing. The opposite end of sensing member 30 is provided with a tapered recess 40 adapted to cooperate with lock means 42 including a member 44 having a sharpened end portion 46 adapted to fit snugly within the recess 40. A collar 48 is secured to member 44 adjacent the sharpened inner end 46 thereof for limiting movement of member 44 in an outward direction. The outer end of member 44 is provided with an enlarged head 50, and a compression spring 52 is disposed in surrounding relationship to member 44 between the housing and enlarged head 50 so as to normally bias member 44 in an outward direction to the unlocked position.

Member 44 is provided with a threaded portion 54 adapted to be threaded into a threaded bore 56 in the end wall of the housing through which member 44 extends. Accordingly, when it is desired to lock sensing member 30 in an inoperative position, member 44 is pushed inwardly and then threaded into bore 56, the sharpened end portion 46 of member 44 fitting within recess 40 formed in the sensing member to thereby hold the sensing member against swinging movement.

Signal means indicates movement of the dirigible wheel 12, and, FIG. 2, comprises a horn 60 which provides an audible signal. Alternatively, a visible signal may include a lamp 62 on the cover of the housing, FIG. 1. The lamp can also be provided on a separate means if so desired which could be placed in a position which is convenient for viewing by a person sitting in the operator's compartment of the vehicle.

A pair of conventional electrical clips 70 are provided, these clips being adapted to be connected with the battery of the vehicle or any other suitable source of electrical energy for operating the signal means associated with the apparatus. A first one of clips 70 is connected by electrical lead 72 with one terminal of horn 60. The other of the clips 70 is connected by electrical lead 74 with a moveable contact 76 supported on sensing member 30 which is preferably formed of a dielectric material. Moveable contact 76 extends laterally on either side of sensing member 30 as seen particularly in FIG. 3 for engaging fixed contacts hereinafter described.

A pair of fixed contacts 80 are mounted on a substantially L-shaped electrically conductive bracket 82 the base leg of which is mounted on a dielectric member 84 supported within housing 20. L-shaped brackets 82 are held in place by screws 86 extending through elongated slots 88 provided in the base legs of the brackets, screws 86 being threaded into suitable threaded holes provided in member 84. Screws 86 also serve to connect each of brackets 82 with an electrical lead 90, the two electrical leads 90 being connected with another terminal of horn 60.

It is apparent that fixed contacts 80 may be adjusted with respect to the sensing member and the moveable contact carried thereby so as to adjust the clearance between the moveable and fixed contacts, and accordingly, the apparatus can be so adjusted that the slightest movement of sensing member 30 will close the switch means including the moveable and fixed contact, thereby closing the circuit through horn 60 and causing the horn to be operated. The electric circuit may also be connected with leads 64 connected with lamp 62 for controlling illumination thereof in accordance with the movement of member 30 and closing of the switch.

Referring now to FIG. 4, the steering movement indicating means includes a fixed means comprising a suction cup 100 adapted to be secured to a suitable part of the vehicle such as the windshield, an elongated rod 102 being fixed to the suction cup and supporting at the outer end thereof an elongated member 104 having a suitable indicia 106 formed thereon. Member 104 may be of arcuate configuration so as to conform to the shape of the steering wheel and be supported adjacent thereto. The movement indicating means also includes a moveable means 110. As seen in FIG. 5, moveable means 110 comprises a clip-like member 112 of generally U-shaped cross-sectional configuration having a pointed indicator portion 114 at one end thereof. This indicator portion is adapted to be disposed adjacent member 104 to cooperate with the indicia formed thereon. Member 112 is formed of a suitable resilient material such as spring steel so that it can be snapped into place on the steering wheel.

In operation, the steering wheel movement indicating means is mounted in position as shown in FIG. 4, and the location of the moveable means 110 with respect to fixed means 104 is noted. At the same time, sensing member 32 of the dirigible wheel movement detecting means is placed in contact with one of the dirigible wheel 12, member 30 being in the centered position as shown in FIG. 2 with moveable contact 76 spaced from fixed contacts 80. Upon sufficient turning movement of the steering wheel, the dirigible wheels move and cause sensing member 30 to pivot about pin 34 moving moveable contact 76 into engagement with one of the fixed contacts 80 dependent on the direction of turning movement of the steering wheel and dirigible wheels. When moveable contact 76 engages one of fixed contacts 80, the horn will blow, thereby signaling to an operator that the dirigible wheels have started to turn. The operator can then readily determine the amount of steering wheel travel by noting the position of moveable means 110 of the steering wheel movement indicating means with respect to fixed means 104.

As this invention may be embodied in several forms without departing from the spirit or essential characteristics thereof, the present embodiment is therefore illustrative and not restrictive.

What is claimed is:

1. Apparatus for use in testing play in the mechanism connecting the steering wheel and the steerable road wheels of a vehicle, comprising a support to be disposed on the road wheel supporting surface adjacent one of the road wheels, sensing means moveably supported by said support and engageable with the respective road wheel for sensing movement by the wheel, and steering wheel movement indicating means mountable at least on the steering wheel for indicating steering wheel travel at least upon initial movement of said sensing means by the road wheel.

2. Apparatus for use in testing play in the mechanism connecting the steering wheel and the steerable dirigible wheels of a vehicle, comprising a housing to be disposed on the road wheel supporting surface adjacent one of the dirigible wheels, sensing means moveably supported by said housing and engageable with said one dirigible wheel, signal means operated by movement of said sensing means to signal initial movement of said one dirigible wheel engaged by said sensing means, and steering wheel movement indicating means mountable at least on the steering wheel for indicating steering wheel travel upon activation of said signal means.

3. Apparatus as defined in claim 2, wherein said steering wheel movement indicating means includes means to be disposed in fixed relation to the vehicle and means carried by the steering wheel and moveable therewith relative to said fixed relation means, said fixed relation means and said moveable means having cooperating means thereon for indicating steering wheel travel.

4. Apparatus as defined in claim 2, comprising an electric circuit connected with said signal means and including switch means mounted on said support and controlled by said sensing means.

5. Apparatus as defined in claim 4, wherein said switch means includes fixed contact means and moveable contact means actuated by said sensing means and engageable with said fixed contact means.

6. Apparatus as defined in claim 4, wherein said sensing means is pivotally supported for swinging movement, said switch means including a member moveable by said sensing means for actuating said switch means.

7. Apparatus as defined in claim 4, wherein said electric circuit includes a source of electrical energy for operating said signal means.

8. Apparatus as defined in claim 2, including lock means engageable with said sensing means to hold said sensing means in position.

9. Apparatus as defined in claim 8, wherein lock means is supported by said housing and is mounted for axial movement with respect thereto.

10. Apparatus as defined in claim 9, including spring means normally biasing said lock means in one direction.

11. Apparatus as defined in claim 10, including threaded means for holding said lock means in locked position against the force of said spring means.

12. Apparatus for measuring play in the mechanism connecting the steering wheel and the steerable road wheels of a vehicle, comprising steering wheel movement indicating means for indicating steering wheel travel upon initial movement of a road wheel, and including means to be disposed in fixed relation to the vehicle and means carried by the steering wheel and moveable therewith relative to said fixed relation means, said fixed relation means and said moveable means having cooperating means thereon for indicating steering wheel movement.

* * * * *